Patented Jan. 13, 1925.

1,522,852

UNITED STATES PATENT OFFICE.

GERALD P. YOUNG, OF DAYTON, OHIO.

SOLVENT FOR CELLULOSE ACETATE.

No Drawing.   Application filed April 11, 1923.   Serial No. 631,357.

*To all whom it may concern:*

Be it known that I, GERALD P. YOUNG, a citizen of the United States, residing at Dayton, in the county of Montgomery and State of Ohio, have invented certain new and useful Improvements in Solvents for Cellulose Acetate, of which the following is a specification.

This invention relates to a certain novel organic compound suitable for lacquers, varnishes or dopes for airplane fabrics and which may be also used in the making of films and similar articles.

Solutions of cellulose acetate are extensively used in the manufacture of lacquers, films and water-proofing and surfacing materials, and solvents chiefly used for this purpose being acetone, diacetone alcohol, and acetylene tetrachloride. Triacetin is also known to be a solvent for a cellulose acetate.

I have found that ethylene glycol diacetate which is the ester formed by the acetylization of ethylene glycol is a new solvent for cellulose esters, such as cellulose acetate, and cellulose nitrate. The formula of ethylene glycol diacetate is believed to be:

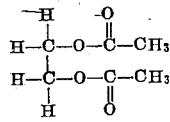

This new solvent will act as a high boiling solvent in the solution with acetone or other similar solvents and will retard the rate of drying and tends to hold the cellulose acetate in solution in the presence of water precipitated on the drying surface from the atmosphere, and will prevent what is commonly termed "blushing." The ethylene glycol diacetate may be used alone or in conjunction with other solvents or diluents. The amount of solvent used depends upon the nature and the purposes for which the solution is to be used and can be readily determined by experiment for the different material desired.

The solution of ethylene glycol diacetate with acetyl cellulose, or cellulose nitrate, causes the film formed when the solvent or solvents evaporate, to remain flexible, due to the slow evaporation of the ethylene glycol diacetate.

I claim:

1. A solvent for acetyl derivatives of cellulose consisting of an ester formed by the acetylization of ethylene glycol.

2. The composition of matter comprising ethylene glycol diacetate and a dissolved cellulose ester.

3. A solvent for cellulose esters consisting of ethylene glycol diacetate.

4. A manufacture to be used as a material in the arts and trades, comprising a solution of cellulose acetate and ethylene glycol diacetate.

In testimony whereof I affix my signature.

GERALD P. YOUNG.